United States Patent
Adams

(10) Patent No.: US 7,729,934 B1
(45) Date of Patent: Jun. 1, 2010

(54) SYSTEM AND METHOD FOR STRATEGIC INTENT MAPPING

(75) Inventor: Thomas Mark Adams, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 937 days.

(21) Appl. No.: 11/230,796

(22) Filed: Sep. 20, 2005

(51) Int. Cl.
  *G06Q 10/00* (2006.01)
(52) U.S. Cl. ......................................................... 705/7
(58) Field of Classification Search ....................... 705/7
  See application file for complete search history.

(56) References Cited

U.S. PATENT DOCUMENTS

| | | | |
|---|---|---|---|
| 5,233,513 | A | 8/1993 | Doyle |
| 6,249,769 | B1 | 6/2001 | Ruffin et al. |
| 6,609,120 | B1 | 8/2003 | Honarvar et al. |
| 6,647,382 | B1 | 11/2003 | Saracco |
| 6,850,892 | B1 | 2/2005 | Shaw |
| 6,859,785 | B2 | 2/2005 | Case |
| 6,876,991 | B1 | 4/2005 | Owen et al. |
| 7,113,923 | B1* | 9/2006 | Brichta et al. ................. 705/35 |
| 7,162,427 | B1 | 1/2007 | Myrick et al. |
| 7,346,529 | B2 | 3/2008 | Flores |
| 2002/0049573 | A1 | 4/2002 | El Ata |
| 2002/0052775 | A1* | 5/2002 | Fisher et al. ................... 705/10 |
| 2002/0099598 | A1* | 7/2002 | Eicher et al. ................... 705/11 |
| 2003/0033167 | A1 | 2/2003 | Arroyo et al. |
| 2003/0093310 | A1 | 5/2003 | Macrae |
| 2003/0120504 | A1 | 6/2003 | Kruk et al. |
| 2003/0130884 | A1 | 7/2003 | Michaluk |
| 2003/0149610 | A1 | 8/2003 | Rowan et al. |
| 2003/0212584 | A1* | 11/2003 | Flores ............................ 705/7 |
| 2004/0039619 | A1 | 2/2004 | Zarb |
| 2004/0059611 | A1 | 3/2004 | Kananghinis et al. |
| 2004/0068429 | A1 | 4/2004 | MacDonald |
| 2004/0172272 | A1* | 9/2004 | Shillinglaw et al. ............ 705/1 |
| 2004/0230463 | A1 | 11/2004 | Boivin |
| 2005/0043977 | A1 | 2/2005 | Ahern et al. |
| 2005/0097505 | A1* | 5/2005 | Gupta et al. ................. 717/101 |
| 2005/0234765 | A1* | 10/2005 | Blumberg et al. ............. 705/10 |

(Continued)

OTHER PUBLICATIONS

Rohm, Improve Public Sector Results With a Balanced Scorecard, U.S. Foundation for Performance Management, 2002, p. 1-33.*

(Continued)

*Primary Examiner*—Beth V. Boswell
*Assistant Examiner*—Justin M Pats

(57) ABSTRACT

Systems and methods for mapping relative strategic intent of tactics and associated projects in an enterprise are provided. Some embodiments provide a computer-implemented tool, a method, and/or a computer-implemented system for mapping strategic intent of an organization. Projects are mapped to tactics and stored in a data store. Fulfillment percentages of tactics are claimed, where the percentages represent the portion of a tactic that is achieved by a project that is mapped to it. Ownership of a tactic may be assigned, which gives the tactic owner authority to grant approval for mapping projects to the owned tactic. Tactic sets, which include groups of tactics having some element in common, may be organized to permit projects to carry over into new time periods. A reporting tool is used to display information such as mapped relationships, ownership, approval status, fulfillment percentage, and tactic sets for use in strategic intent mapping.

15 Claims, 4 Drawing Sheets

U.S. PATENT DOCUMENTS

2006/0080156 A1* 4/2006 Baughn et al. .................. 705/7
2006/0085255 A1* 4/2006 Hastings et al. ............... 705/14

OTHER PUBLICATIONS

Wilcox, Richard E., et al., "System and Method for Strategic Planning," Filing Date—Dec. 23, 2003, U.S. Appl. No. 10/745,198, Specification (26 pgs.) and Drawings (4 pgs).

Adams, Mark, "Strategic Valuation System and Method," Filing Date—Mar. 15, 2005, U.S. Appl. No. 11/080,729, Specification (35 pgs.) and Drawings (3 sheets).

Kaplan, Robert S., et al., "The Strategy Focused Organization—How Balanced Scorecard Companies Thrive in the New Business Environment," Harvard Business School Press, 2001, please see the following chapters: Chapter 1—"Creating the Strategy-Focused Organization," pp. 1-27; Chapter 3 "Building Strategy Maps," pp. 69-105; Chapter 12—"Feedback and Learning," pp. 303-329.

PERFORMANCESOFT, "Software Product Tour Downloads," http://www/performancesoft.com/pbviews/downloads.asp, Mar. 22, 2006, pp. 1-2.

PERFORMANCESOFT, "Software Features," http://www.performancesoft.com/pbviews/features.asp, Mar. 22, 2006, pp. 1-2.

Wilcox, Richard E., et al., U.S. patent application entitled "Systems and Methods for Strategic Planning," U.S. Appl. No. 11/669,536, filed Jan. 21, 2007.

Office Action dated Apr. 29, 2008, 26 pgs., U.S. Appl. No. 10/745,198, filed Dec. 23, 2003.

Office Action dated Apr. 30, 2008, 22 pgs., U.S. Appl. No. 11/669,536, filed Jan. 31, 2007.

Thomas, Joe G., "Strategic Management: Concepts, Practice, and Cases," Harper & Row Publishers: New York, 1988.

Flores, Michael G., "The Strategic Planning Solution," Bottomline, vol. 7, No. 6, Jun. 1990, pp. 32-34.

Kaplan, Robert S. and Norton, David P., "Using the Balances Scorecard as a Strategic Management System" Harvard Business Review, Jan.-Feb. 1996.

Kaplan, Robert S. and Norton, David P., "The Strategy-focused Organization: How Balanced Scorecard Companies Thrive in the New Business Environment," Harvard Business School Press, Boston, 2001, pp. 69-105 and 273-301.

Tarabanis, Konstantinos, "Building an Enterprise Architecture for Public Administration: A High-Level Data Model for Strategic Planning," the 9th European Conference on Information systems, Jun. 27-29, 2001, pp. 987-998.

Youker, Robert, "Defining the Hierarchy of Project Objectives," American Society for the Advancement of Project Management, 2001.

Office Action dated Oct. 9, 2008, 23 pages, U.S. Appl. No. 10/745,198, filed Dec. 23, 2003.

Office Action dated Oct. 8, 2008, 21 pages, U.S. Appl. No. 11/669,536, filed Jan. 31, 2007.

Norton, David P., "The Balanced Scorecard: Translating Strategy into Action," The Balanced Scorecard Collaborative, Oct. 1999.

Becker, Brian, et al., "The HR Scorecard: Linking People, Strategy, and Performance," Summaries.com, 2001.

ACTIVESTRATEGY, "Balanced Scorecard Enterprise Strategy Execution Software," http://www.activestrategy.com, 2002.

Irwin, D., "Strategy Mapping in the Public Sector," 35 Long Range Planning, pp. 635-657, 2002.

Rohm, Howard, "Improve Public Sector Results with a Balanced Scorecard: Nine Steps to Success," Balanced Scorecard Institute 2002.

Sevcik, Galen R., "A Summary of Cam Sholey's Strategy Mapping Session," The American Institute of Certified Public Accountants, Feb.-Mar. 2002.

Averson, Paul, "Building a Government Balanced Scorecard," Balanced Scorecard Institute, Mar. 2003.

Final Office Action dated Mar. 10, 2009, 27 pages, U.S. Appl. No. 10/745,198, filed Dec. 23, 2003.

Final Office Action dated Mar. 11, 2009, 24 pages, U.S. Appl. No. 11/669,536, filed Jan. 31, 2007.

Office Action dated Apr. 30, 2009, 7 pages, U.S. Appl. No. 11/080,729, filed Mar. 15, 2005.

Office Action dated Oct. 7, 2009, 21 pages, U.S. Appl. No. 11/080,729, filed Mar. 15, 2005.

Examiner's Answer dated Nov. 10, 2009, 34 pages, U.S. Appl. No. 11/669,536, filed Jan. 31, 2007.

Examiner's Answer dated Nov. 17, 2009, 32 pages, U.S. Appl. No. 10/745,198, filed Dec. 23, 2003.

* cited by examiner

SYSTEM AND METHOD FOR STRATEGIC INTENT MAPPING

CROSS-REFERENCE TO RELATED APPLICATIONS

The present application contains subject-matter related to U.S. patent application Ser. No. 10/745,198, filed Dec. 23, 2003, by Richard E. Wilcox, et al., entitled System and Method for Strategic Planning and U.S. patent application Ser. No. 11/080,729, filed Mar. 15, 2005 entitled "Strategic Valuation System and Method," by Mark Adams, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to achievement of strategies followed by business enterprises, and more particularly, but not by way of limitation, to systems and methods for mapping strategic intent in an enterprise by mapping projects to the tactics they achieve and reporting based on mapped information.

BACKGROUND OF THE INVENTION

In a business enterprise, the executives in business organizations making up the enterprise make relative choices among competing projects to determine which will be undertaken and/or continued. The decision process in making these relative choices generally involves both a financial assessment and an assessment of the strategic importance of each project. The resulting choices may then be measured very tightly at the enterprise level in economic terms, but there is little capability to measure those choices in strategic terms.

SUMMARY OF THE INVENTION

Systems and methods for mapping relative strategic intent of initiatives, tactics, and associated projects in an enterprise are provided. Some embodiments provide a computer-implemented tool for mapping strategic intent of an organization, comprising a data store operable to maintain a plurality of projects and a plurality of tactics and a mapping component operable to map each of the plurality of projects to more than one of the plurality of the tactics based on the strategic intent of the organization. The computer-implemented tool provided herein may also include a reporting tool operable to display the map of each of the plurality of projects to more than one of the plurality of tactics. The computer-implemented tool provided herein may also comprise a fulfillment component operable to associate a fulfillment percentage of a tactic relative to a project mapped to the tactic, wherein the data store is further operable to store the fulfillment percentage.

Various embodiments of the present disclosure provide a method for mapping strategic intent of an organization comprising mapping at least one project to a plurality of tactics and claiming a fulfillment percentage for each of the projects relative to each tactic to which it is mapped. The method provided herein may additionally include assigning ownership of each tactic to a tactic owner, wherein the tactic owner has authority to grant approval for mapping each project to the tactic owned by the tactic owner.

The method disclosed herein may also include reporting one or more relationships established by the mapping, reporting whether the owner has granted approval, reporting one or more fulfillment percentages and the sum of the fulfillment percentages of all projects mapped to a tactic and analyzing strategic intent for a portion of the enterprise for the entire enterprise.

Still other embodiments of the present disclosure provide a computer-implemented system for mapping strategic intent, comprising a data store operable to maintain to a plurality of projects, a plurality of tactics, and a plurality of tactic sets, the tactic sets related to tactics and including a time component and a mapping component operable to map one of the plurality of projects to more than one of the plurality of the tactics and one of the plurality of tactic sets based on the strategic intent of the organization.

The computer-implemented system provided herein may further comprise a fulfillment component related to fulfillment of each mapped tactic by each project, wherein the fulfillment component including a percentage fulfillment of each mapped tactic achieved by each project. The computer-implemented system provided herein may further comprise a reporting component operable to display mapping between plurality of projects, at least one of the plurality of the tactics and at least one of the plurality of tactic sets for a time component.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
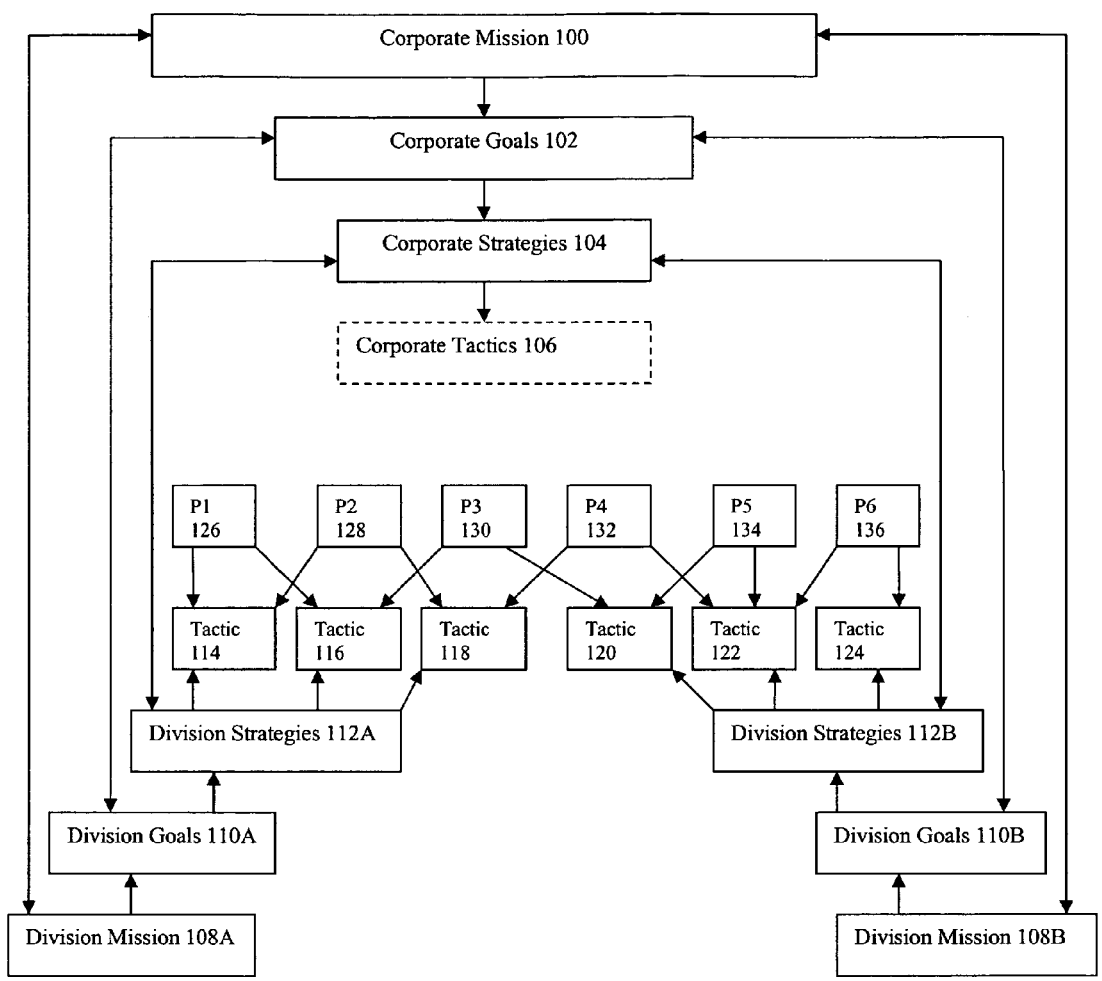
FIG. 1 is a block diagram of a strategic intent map according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the present invention provide a hierarchical map that promotes consistent analysis of the strategic intent of an enterprise or portion of an enterprise. The maps can contain information about an enterprise and its focus such as the mission, principles, values, and organizational structure. Rigor is provided by the mapping of goals, objectives, and strategies to specific projects. This can be contrasted with a situation where goals exist at a high level and projects exist at a low level, but there is no explicit connection between the goals and projects. By identifying and mapping information in the manner disclosed herein, individual work units may be linked upwardly to higher level organizations, and new projects or those with work in progress may be validated to ensure the projects support the intent and/or overall direction of the enterprise.

In an enterprise, the business organizations within that enterprise generally undertake tactics to achieve their business objectives and the corporate strategies set out at the enterprise level. Additional information related to strategic planning is described in U.S. patent application Ser. No. 10/745,198, filed Dec. 23, 2003, by Richard E. Wilcox, et al., entitled System and Method for Strategic Planning which is hereby incorporated by reference in its entirety. Tactics may be defined within a particular enterprise as, for example, strategies, action items, programs, plans, schemes, courses, approaches, paths, or other terms as used by a business enterprise to describe its means of achieving overall objectives. The term "tactics" may alternatively describe or be used interchangeably with the term "initiatives." Such tactics may include specific actions focused on improving current profitability (e.g., increasing market share for a product line), specific actions focused on future profitability (e.g., developing a new product line based on a new technology), and business support objectives (e.g., increasing customer satisfaction or improving employee retention). The tactics are implemented by multiple projects managed in a coordinated manner to fulfill goals at the corporate level as well as those at the business organization level.

Embodiments of the present disclosure provide strategic intent mapping systems and methods that permit an enterprise to analyze how projects are associated with the various tactics, evaluate the fulfillment of the tactics by projects associated with them, and make strategic decisions based on the interactive mapping of low-level projects to achievement of higher level tactics. In these embodiments, as can be seen in FIG. 1, executives at the corporate level develop a framework or hierarchy for strategic planning.

FIG. 1 is a block diagram of one embodiment of a strategic intent map that is graphically illustrated using the present system and process. At the highest level is the corporate mission 100, which can be a brief, direct statement of the fundamental purpose for the existence of the enterprise. Corporate goals 102 support the corporate mission 100 and can be a set of broad fundamental aims tied to a certain time frame within which the organization is expected to accomplish that goal. Corporate goals 102 are often general in nature, dealing with what the enterprise wishes to accomplish, not how it will be accomplished. Corporate strategies 104 can be high-level directions that contribute to achieving the corporate goal 102 with which they are associated. Strategies 104 often identify how a goal is to be achieved and typically contain words such as "by" or "via." Finally, corporate tactics 106 can be priority programs that are tied to the delivery of capabilities in satisfaction of a certain corporate strategy 104. Tactics 106 typically consist of multiple projects managed in a coordinated manner. The relationships between each of these levels are illustrated in FIG. 1. Any number of levels in the hierarchy may be defined as needed by an organization, such that there are more specific activities supporting the less specific high-level goals higher up in the hierarchy.

In these embodiments, there is a corresponding framework at the division or business unit level, established by decision-makers for the particular division. The planning framework established at the division level is often more specific than that at the corporate level. Division missions 108 can be clear and compelling overall objectives for the particular division that tie to the overall corporate mission 100. The number of various division missions may correspond to the number of actual business divisions in the enterprise, for example, two division missions 108A and 108B are shown for two divisions in FIG. 1. Division missions 108 may mirror the corporate mission 100, or may be more specific to the particular division. Division goals 110A and 110B can set out what specifically should be accomplished within a given timeframe in specific, measurable, and realistic terms. Division strategies 112A and 112B can be developed to outline specific approaches to how the division can achieve the division goals 110A and 110B respectively. A division may align one or a plurality of strategies with a particular goal. Division tactics, such as 114, 116, 118, 120, 122, and 124 can be specific actions to be taken to achieve the strategies 112A and 112B, often having targets and timeframes stated particularly. Division tactics correspond to the initiatives at the enterprise level. The relationships between the number of tactics and the strategies for one embodiment of the present disclosure may be seen in FIG. 1. Various divisions have projects 126, 128, 130, 132, 134, and 136 that support the tactics 114, 116, 118, 120, 122, and 124. The terms "tactic" and "initiative" may be used herein interchangeably.

Although FIG. 1 shows one goal, one mission, one strategy and so on, many of each may exist: there may be many goals for one mission, many strategies for each goal, and many tactics for each strategy. Additionally, though FIG. 1 shows multiple divisions within the corporate structure, the divisions may not be present and projects may directly support one or more corporate tactics, for example.

As will be seen, various embodiments of the present disclosure allow decision makers at any level to map projects and tactics to the higher level strategies that they fulfill or help to fulfill. This mapping may be used, for example, to evaluate which projects support each tactic, analyze whether a tactic is adequately or under-supported by projects, review the progress made toward achievement of strategies and goals, and keep track of spending for each tactic, strategy, and so on. As will be disclosed, some of the embodiments associate a fulfillment percentage for a project that indicates what percentage of the tactic is fulfilled by each project that is mapped to it. Associating a fulfillment percentage to projects allows decision makers to assess whether a tactic is adequately supported. The fulfillment percent may be monitored to determine if the fulfillment of all supporting projects approaches or exceeds 100%, and correcting for a tactic that is overly supported. If the total sum of fulfillment percentages for projects mapped to a tactic is less than 100%, decision makers may evaluate whether and how to take additional steps to adequately support the tactic. Various embodiments allow an owner to exert or be assigned ownership over a tactic. The present disclosure permits mapping across time boundaries by use of tactic sets that associate or relate tactics having commonalities, such as, for example, a plurality of tactics, each having some time period such as a calendar or fiscal year or other time period.

In embodiments of the system and method of the present disclosure, as shown in FIG. 1, a project such as, for example, project 126, may be mapped to more than one tactic, such as tactic 114 and tactic 116. Similarly, as exemplified in the embodiment shown in FIG. 1, projects may be mapped to a plurality of tactics: project 128 may be mapped to tactic 114 and tactic 118; project 130 may be mapped to tactic 116 and tactic 120, project 132 may be mapped to tactic 118 and tactic 122, project 134 may be mapped to tactic 120 and tactic 122, and project 136 may be mapped to tactic 122 and tactic 124. Projects could be mapped to tactics in multiple different divisions, or within a single division. One or more projects may be mapped to one, two, or more tactics regardless of the division of the projects or tactics. The issue of which division pays for a project may arise where projects support multiple tactics that are associated with and benefit different divisions.

When a project is mapped to multiple tactics, in one embodiment, the tactics could be designated as the primary tactic, secondary tactic and so on. In such an embodiment, the division owning the primary tactic supported by the project could assume the cost of the project. Alternatively, when a project is mapped to multiple tactics, the cost of the project could be divided evenly among all of the divisions owning supported tactics. In another embodiment, a project's cost could be divided proportionally among various divisions that own supported tactics based on the portion of each tactic the that project purports to fulfill and the strategic value of each tactic overall. The strategic value may be evaluated using various methods, such as those disclosed in U.S. patent application Ser. No. 11/080,729, filed Mar. 15, 2005 entitled "Strategic Valuation System and Method," by Mark Adams, hereby incorporated by reference in its entirety. In still another embodiment, cost for a project mapped to multiple tactics could be allocated partially or wholly based on a budget set by the divisions associated with supported tactics.

Various embodiments add a time component to strategic intent mapping, such that tactics having commonalities may be associated in one or more tactic sets. For example, a tactic may be associated with all of the other tactics for a calendar year in a tactic set for that particular calendar year. Due to the fact that tactics often span across multiple calendar years, the tactic may be associated with a tactic set for the current and following years, and additionally with a tactic set that includes the similar tactics in the current calendar year, or perhaps having a different year or period. This permits decision makers, for example, to analyze the progress made on all projects in a past year and to use that information for performance evaluations. This additionally permits decision makers, for example, to plan into future periods of time without recreating or remapping all the information that carries over into the new time period, such as a new calendar year or new fiscal year. Tactic sets may also relate tactics having other things in common, such as those supporting the same strategy, or those having similar budget sources, or grouped by ownership, or as may be useful for intent mapping and planning.

Figure 2:
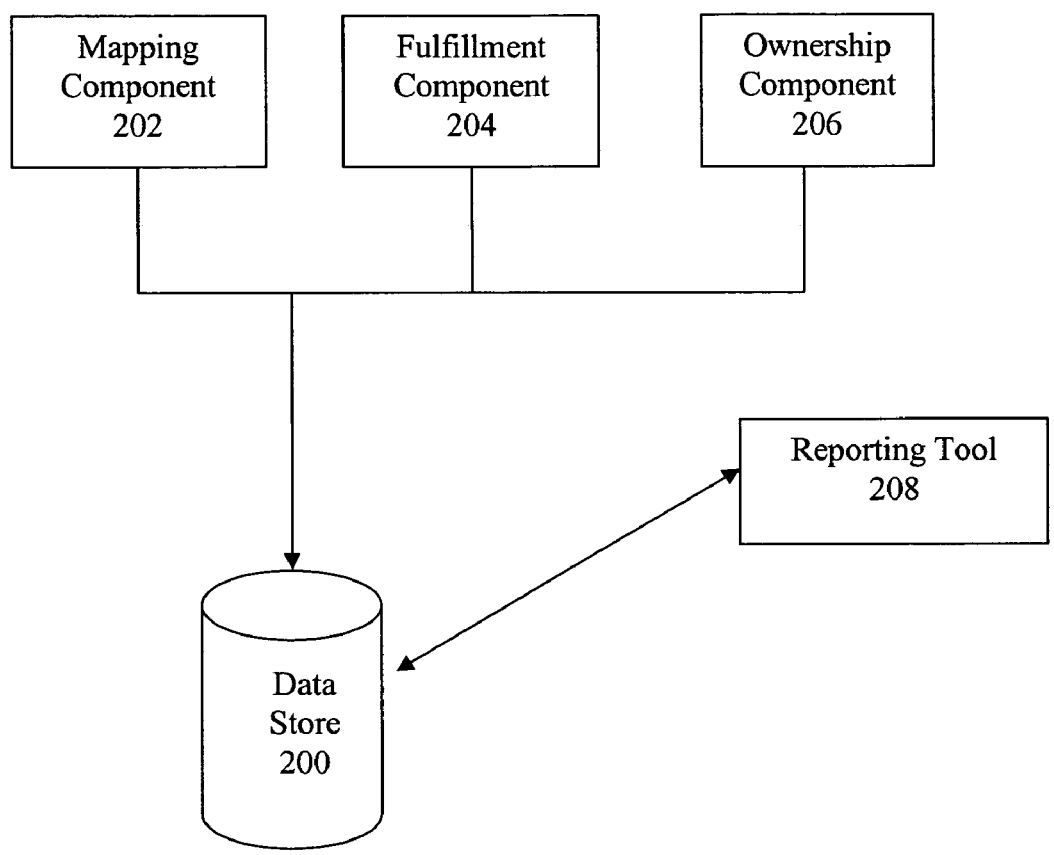
FIG. 2 shows a block diagram of a strategic intent mapping system in accordance with one or more embodiments.

FIG. 2 shows a block diagram of a strategic intent mapping system in accordance with one or more embodiments. This strategic intent mapping system includes a data store 200, a mapping component 202, a fulfillment component 204, an ownership component 206, and a reporting tool 208. The data store 200 is configured to store relationships between an enterprise and divisions of the enterprise, as well as the relationships between projects, tactics, and strategies. In some embodiments, the data store 200 is additionally configured to store the fulfillment percentage of each tactic based on the project(s) mapped to it. In some embodiments, the data store 200 is configured to store ownership of projects, tactics, and strategies. The data store 200 may further be configured to store information regarding funding allocated to the business organizations, the strategies, and the projects. The data store 200 may be further configured to store information regarding the progress toward completion, actual effort, and cost associated with each project, tactic or strategy, as well as any other information that is useful to enterprise planning.

In various embodiments of the present disclosure, the mapping component 202 includes functionality to allow projects in the enterprise to be mapped to one or more of the tactics. A project is mapped to a tactic if it supports or is related to the tactic in some manner or adds value to the progress towards achieving the tactic. In various embodiments, the mapping component 202 is operable to map projects to a plurality of tactics. The relationships mapped between projects and tactics may then be stored in the data store 200.

In various embodiments, the fulfillment component 204 is configured to associate a fulfillment percentage with each project that is mapped to that particular tactic. A fulfillment percentage may express a claim as to the percentage of the tactic that is achieved by a particular project. For example, if a single project will achieve the tactic without requiring any other activities, the fulfillment percentage is 100%. Similarly, if three projects each contribute equally to achieving a tactic that all three are mapped to and no other projects are necessary to achieve the tactic, the fulfillment percentage claimed for each project may be approximately 33%. By summing the fulfillment percentages of all projects mapped to a tactic, decision makers may assess whether a tactic is being adequately addressed, or whether additional resources, personnel, and projects should be allocated to the tactic. The fulfillment percentage may be used to estimate progress towards achievement of the tactic while projects are ongoing. The fulfillment percentage may also be used to analyze the tactic after completion to determine whether the tactic is at least partially achieved relative to or in accordance with the fulfillment percentage claimed. The assigned fulfillment percentage may be stored in the data store 200 and may be associated with the project, the tactic to which it pertains, or both.

The ownership component 206 is operable to assign ownership of a tactic to a tactic owner. The ownership component 206 may also be configured to assign ownership of a project. When a project is mapped to a tactic by the mapping component 202, the ownership component 206 is operable to require the owner of a tactic to approve the mapping. The ownership component 206 empowers the owner to approve projects, for example, that are necessary and actually support the owner's tactic. The owner may also reject the mapping of projects, for example, that overextend the budget or are unrelated to the owner's tactic. The owner's approval of a project may be based on, for example, strategic, financial, or other reasons. The owner's approval may alternatively or additionally be based on whether a tactic is adequately covered by projects already mapped to that particular tactic. Ownership information of a tactic may be stored in the data store 200.

In some embodiments, the ownership component 206 may be centrally managed, for example, by a central individual with decision making authority using enterprise-wide terminology. Alternatively, the ownership component 206 may be managed by distributed management, for example, by each owner managing their own content. In some embodiments, a tactic owner may only approve or reject mappings of projects to their tactics. Alternatively, the tactic owners may have the authority to change the fulfillment percentages of projects mapped to their tactics.

The reporting tool 208 includes functionality to generate and, if desired, display reports of the data stored in the data store 200. Reports provided by the reporting tool 208 may be in a printed format or may alternatively be displayed on a computer screen. The views present data about the strategic intent mapping valuation of the initiatives and projects at the enterprise level, the business organization level, and the initiative level. For example, a view may show the relationships of all ongoing projects to all ongoing tactics of the various business organizations. Another view may show the total fulfillment percentages for a tactic, relative to the projects mapped to that tactic. A third view may reflect progress made or estimated towards achievement of a tactic based on fulfillment percentages and progress made in projects mapped to the tactic. Yet another view may show corporate and business unit alignment as well as cross-organizational support in terms of missions, goals, strategies, initiatives, tactics, and projects. Still another view may show cost allocation for projects that support more than one tactic or strategy. Project management data can be incorporated in another view to show actual spending at the tactic, initiative or any other higher aggregate level. Views may be manipulated to report the desired combination of information for strategic intent planning.

If the report is displayed on a computer display, a graphical chart may be displayed such that a user can use a mouse or other selection mechanism to select an element in the chart and the display can show elements related to the selected element at higher and lower levels. For example, selecting a tactic by, for example, clicking on it with a computer mouse, might cause the reporting tool 208 to display a report reflecting a list of projects mapped to the selected tactic, the amount of money spent to date on achieving the selected tactic, an estimated amount of money needed to achieve the selected tactic, and other information related to the selected tactic.

Figure 3:
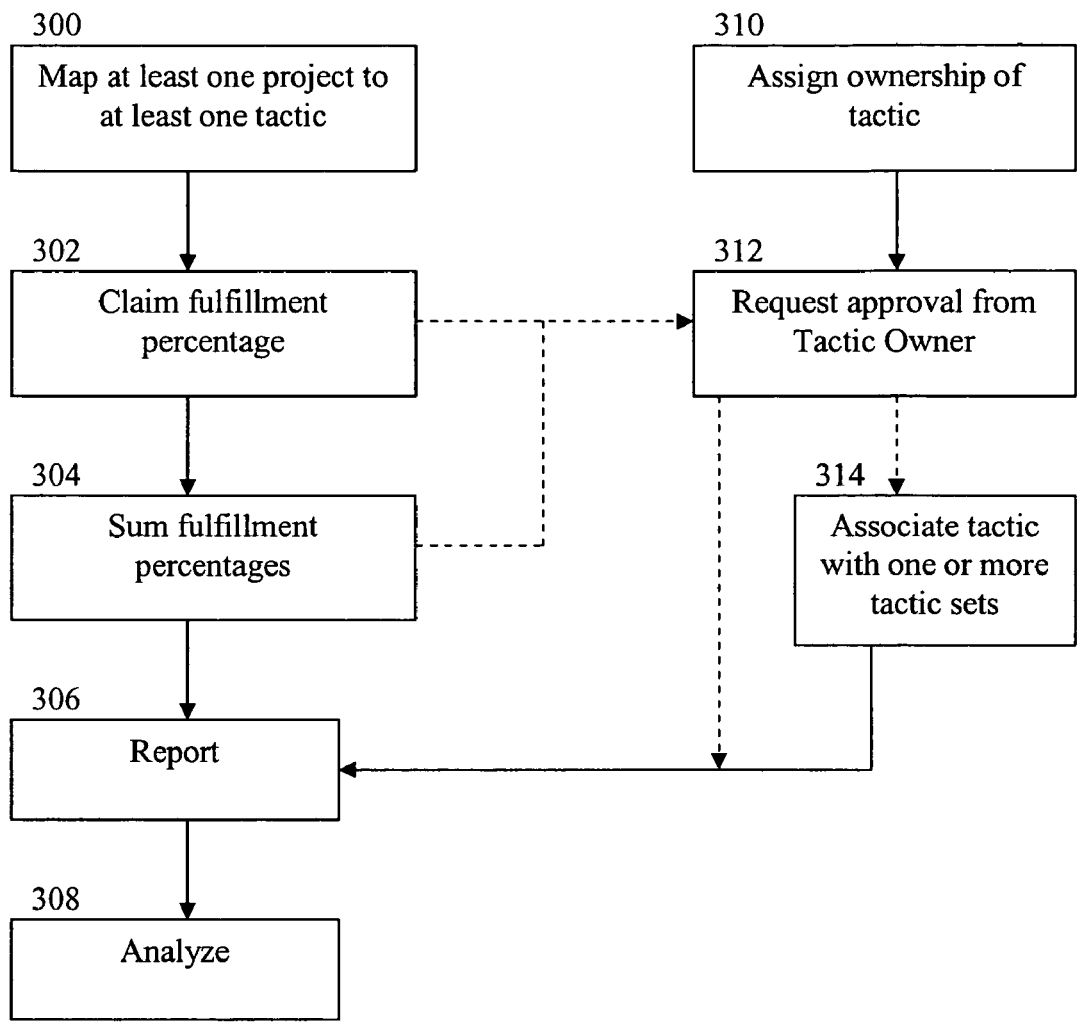
FIG. 3 is a flow-chart of the strategic intent mapping method in accordance with one or more embodiments.

FIG. 3 is a flow chart of a method for strategic intent mapping in accordance with one embodiment. At block 300, a decision maker, which may include a leadership team, maps at least one project to at least one tactic. A single project may be mapped to a single tactic, or to a plurality of tactics. A plurality of projects may be mapped to a single tactic, or to a plurality of tactics.

At block 302, the decision maker claims a fulfillment percentage for each project mapped to each tactic. As discussed previously, the fulfillment percentage claimed represents an assessment of what portion of a tactic is achieved by a particular project that is mapped to the tactic. The fulfillment percentage may be associated with the tactic, such that reporting on the tactic illustrates the degree of fulfillment of the tactic. The fulfillment percentage may also be associated with the project, such that a report on the project illustrates all tactics supported by the project, i.e. all tactics to which the project is mapped.

At block 304, the fulfillment percentages of any given tactic are summed. By summing the fulfillment percentages, a decision maker may analyze whether a tactic is overly supported, by having a sum of fulfillment percentages greater than 100%, and decide to reduce the support for that tactic accordingly or alternatively, reduce the fulfillment percentages proportionally until the sum equals 100%. A decision maker might also choose to not grant approval for any new projects to be mapped to the tactic. Additionally, by summing the fulfillment percentages, a decision maker may analyze whether a tactic is inadequately supported, by having a sum of fulfillment percentages less than 100%, and decide to develop additional projects or invest additional funds in support for that tactic accordingly or alternatively, increase the fulfillment percentages proportionally until the sum equals 100%. This action may be done similar to that disclosed in U.S. patent application Ser. No. 11/080,729, filed Mar. 15, 2005 entitled "Strategic Valuation System and Method," by Mark Adams.

At block 306, the information resulting from mapping 300, claiming 302, and summing 304 may be reported. A report may be illustrated graphically or may be a written report. A report may be displayed on a computer display or printed. Reporting permits a decision maker or group of decision makers to view the relationships between lower levels to higher levels such as relationships between one or more projects, one or more tactics, one or more strategies, and so on up the corporate hierarchy. Reporting 306 further allows decision makers to view information such as budget allocation, timing, progress, and other details on various projects, as they relate to fulfillment of higher level goals, strategies, tactics, etc. and make strategic decisions relating to the overall objectives of the enterprise.

At block 308, decision makers may use the information reported during reporting 306 to analyze the mapped relationships and information reported. For instance, the information reported can help in determining the future of projects. If a tactic changes, a project supporting the tactic may no longer be necessary to achieve that tactic. If such a project is not mapped to any other tactics, it can safely be canceled. If such a project supports other tactics or if there are other reasons for the project to exist, it can be continued. The system is operable to correlate changes to any related projects when tactics are changed or modified. Determining whether to continue a project whose parent tactic was modified was previously difficult because the linkages between projects and tactics were not explicitly expressed.

A strategic intent map created in accordance with embodiments of the present disclosure can aid in the development of an enterprise architecture plan. Elements in the strategic intent map can carry over into the enterprise architecture plan by maintaining consistency among the strategic plans used by various organizations and for various reasons.

Analysis at block 308 may include the ability to trace a path from a tactic back up the hierarchy, and the ability to view the impacts of tactics and projects on other tactics and projects within an organization and across multiple organizations. A strategic intent map created according to various embodiments defines and identifies organizational planning elements and interrelates or ties these elements so that new projects or those projects with work in progress may be assessed to ensure the projects support the intent and/or direction of the business.

Analysis at block 308 may additionally include reallocating resources based on the priorities of tactics, as well as comparing the actual versus planned spending for specific tactics or the strategies they support, for example. Analyzing fulfillment percentages may include, for example, comparing progress on various projects with a percentage of the total allocated to assess whether funds spent are furthering progress not only on projects, but also on the tactics which the projects support. Additionally, analyzing fulfillment percentages and status reports may enable an appraisal of whether the claimed deliverable is matched by progress to achieving the deliverable.

In various embodiments of the present disclosure, an additional step assigning ownership may be included at block 310. In this block 310, ownership of a tactic is assigned to a tactic owner, typically a person with the authority and responsibility of carrying out day-to-day monitoring and planning towards achieving the goals enumerated by the tactic. A tactic owner may be responsible for making sure that a tactic is adequately supported by projects to achieve the tactic. A tactic owner may also be responsible for eliminating projects that are mapped to a tactic, but not necessary to carry it out. A tactic owner may additionally have authority over a budget for the tactic that is allocated to the various projects that contribute value towards the tactic. Ownership of a tactic may optionally be displayed during reporting at block 306.

At block 312, approval from the tactic owner may be elicited before permitting a project to be mapped to the tactic. Approval may be desirable, for instance, if mapping a project to a tactic results in the cost of the project being allocated to the tactic's budget. Whether approval from the tactic owner is pending or granted may optionally be displayed during reporting 306.

At a block 314, a tactic may optionally be associated in a tactic set. A tactic set may be defined as related to one or more of the tactics during a given time period, for example, all tactics that are active during a given calendar or fiscal year. Tactic sets may be desirable, for instance, for carrying projects over from one time period to another, such as projects that carry over from one year to the next. A tactic may optionally be associated with a tactic set for an upcoming time period, and additionally with a tactic set that spans both time periods. For example, a tactic set for a time period permits decision makers to analyze the progress made in a past year and use that information for performance evaluations. A tactic set for a time period as well as a tactic set spanning multiple time periods additionally permits decision makers to, for example, plan into future periods of time without recreating or remapping all the information that carries over into a new time period, such as a new calendar year or new fiscal year. Tactic sets are also useful in screening of historical data. Tactic sets and their associated tactics from past time periods that are no longer active can be hidden in current displays, yet remain available for comparative reporting. Information relating to a tactic and any tactic sets to which it belongs may optionally be displayed during reporting 306.

Figure 4:
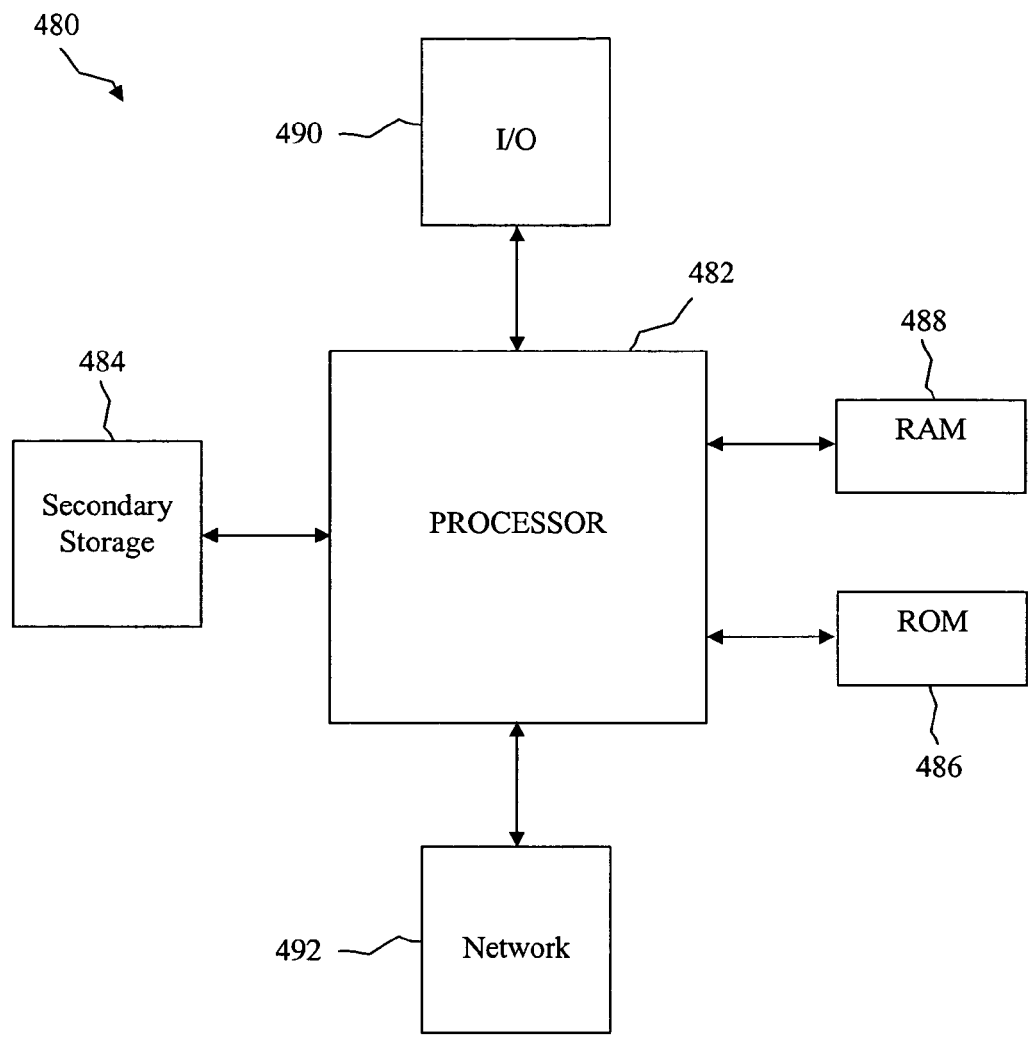
FIG. 4 illustrates an exemplary general purpose computer system suitable for implementing one or more embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity 492 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. At least one computer readable storage medium storing embedded program code which, when executed by a processor, performs a computer implemented method for mapping an overall direction of an organization, the computer implemented method comprising:

maintaining a plurality of projects and a plurality of tactics on a computer readable storage medium, wherein each of the plurality of tactics is implemented by one or more of the plurality of projects to fulfill an organizational goal of the organization;

mapping, with a mapping component executed by a processor, each of the plurality of projects to one or more of the plurality of tactics to create a strategic intent map, wherein at least one of the plurality of projects is mapped to more than one of the plurality of tactics, wherein the strategic intent map identifies and hierarchically interrelates the organizational goal with the plurality of tactics that support the organizational goal and each of the plurality of tactics with the mapped one or more of the plurality of projects;

assigning, with a fulfillment component executed by a processor, for each of the plurality of projects, a tactic fulfillment percentage of each tactic of the plurality of tactics to which each of the plurality of projects is mapped, wherein the tactic fulfillment percentage is a percentage of a tactic that is achieved by a project mapped to the tactic;

summing, with the fulfillment component, for each tactic of the plurality of tactics, the tactic fulfillment percentage assigned to the tactic for all of the plurality of projects that are mapped to the tactic to generate a summed fulfillment percentage of the tactic, wherein the computer readable storage medium is further configured to store the tactic fulfillment percentage of each of the plurality of projects mapped to the one or more of the plurality of tactics and the summed fulfillment percentage of each of the plurality of tactics; and displaying on a computer display, with a reporting component, the strategic intent map, the summed fulfillment percentage of each of the plurality of tactics, and for each of the plurality of projects, the tactic fulfillment percentage of each tactic to which each of the plurality of projects is mapped.

2. The computer readable storage medium of claim 1, wherein the reporting component further displays an indication of whether the mapping of each of the plurality of projects to one or more of the plurality of tactics has been granted approval by a tactic owner.

3. The computer readable storage medium of claim 1, wherein the method further comprises:

displaying, with the reporting component, at least one of the plurality of tactics; and identifying, with the reporting component, each of the plurality of projects mapped to the tactic.

4. The computer readable storage medium of claim 1, wherein the method further comprises:

allocating a cost for a project mapped to multiple tactics based, wholly or partially, on budgets set by divisions associated with supported tactics, wherein the divisions comprise sub-organizations within the organization.

5. The computer readable storage medium of claim 1, wherein a time component is added to the strategic intent map such that tactics having commonalities are associated in one or more tactic sets.

6. The computer readable storage medium of claim 5, wherein the tactic sets further relate tactics having additional commonalities, wherein the additional commonalities relate to at least one of those tactics that support the same strategy, those tactics that have similar budget sources, and those tactics that have similar ownership.

7. A computer-implemented method for mapping an overall direction of an organization comprising:

mapping, with a processor, each of a plurality of projects to one or more of a plurality of tactics to create a strategic intent map, wherein each of the plurality of tactics is implemented by one or more of the plurality of projects to fulfill an organizational goal of the organization, wherein at least one of the plurality of projects is mapped to more than one of the plurality of tactics, and wherein the strategic intent map identifies and hierarchically interrelates the organizational goal with the plurality of tactics that support the organizational goal and each of the plurality of tactics with the mapped one or more of the plurality of projects;

claiming, with a processor, for each of the plurality of projects, a tactic fulfillment percentage of each tactic of the one or more of the plurality of tactics to which each of the plurality of projects is mapped, and wherein the tactic fulfillment percentage is a percentage of a tactic that is achieved by a project mapped to the tactic;

summing, with a processor, for each tactic of the plurality of tactics, the tactic fulfillment percentage claimed for the tactic for all of the plurality of projects that are mapped to the tactic to generate a summed fulfillment percentage for the tactic; and reporting on a computer display, with a processor, the strategic intent map, the summed fulfillment percentage of each of the plurality of tactics, and for each of the plurality of projects, the tactic fulfillment percentage of each tactic to which each of the plurality of projects is mapped.

8. The computer-implemented method of claim 7, further comprising:

assigning, with a processor, ownership of each tactic to a tactic owner.

9. The computer-implemented method of claim 8, wherein the tactic owner has authority to grant approval for mapping each project to the tactic owned by the tactic owner.

10. The computer-implemented method of claim 7, further comprising:

reporting, with a processor, one or more relationships established by the mapping; and analyzing the overall direction for the organization.

11. The computer-implemented method of claim 8, further comprising:

reporting, with a processor, whether the owner has granted approval for mapping one or more of the plurality of projects to the tactic owned by the tactic owner; and analyzing, with a processor, the overall direction for the organization.

12. A computer-implemented system comprising:

one or more processors that perform the following:

operate a computer readable medium to maintain to a plurality of projects, a plurality of tactics, and a plurality of tactic sets, the tactic sets relate to tactics and include a time component, wherein each of the plurality of tactics is implemented by one or more of the plurality of projects to fulfill an organizational goal;

operate a software mapping component to map each of the plurality of projects to one or more of the plurality of the tactics and one of the plurality of tactic sets to create a strategic intent map, wherein at least one of the plurality of projects is mapped to more than one of the plurality of tactics, and wherein the strategic intent map identifies and hierarchically interrelates the organizational goal with the plurality of tactics that support the organizational goal and each of the plurality of tactics with the mapped one or more of the plurality of projects;

operate a tactic fulfillment component to assign, for each of the plurality of projects, a tactic fulfillment percentage of each tactic of the one or more of the plurality of tactics to which each of the plurality of projects is mapped, wherein the tactic fulfillment percentage is a percentage of a tactic that is achieved by a project mapped to the tactic;

operates the tactic fulfillment component to sum, for each tactic of the plurality of tactics, the tactic fulfillment percentage assigned to the tactic for all of the plurality of projects that are mapped to the tactic to generate a summed fulfillment percentage of the tactic, wherein the computer readable medium is further configured to store the tactic fulfillment percentage of each of the plurality of projects mapped to one or more of the plurality of tactics and the summed fulfillment percentage of each of the plurality of tactics; and operate a reporting component to display on a computer display the strategic intent map, the summed fulfillment percentage of each of the plurality of the plurality of tactics, and for each of the plurality of projects, the tactic fulfillment percentage of each tactic to which each of the plurality of projects is mapped.

13. The computer-implemented system of claim 12, wherein a first tactic set relates to a first tactic in a first year, a second tactic set relates to the first tactic during a second year, and a carry-over tactic set relates to the first tactic during the first and second years.

14. The computer-implemented system of claim 12, wherein the one or more processors further operate the reporting component to display mapping between the plurality of projects, at least one of the plurality of the tactics, and at least one of the plurality of tactic sets for the time component.

15. The computer-implemented system of claim 14, wherein the one or more processors further operate the reporting component to display mapping between the plurality of projects, at least one of the plurality of the tactics, and at least one of the plurality of tactic sets for more than one time component.

* * * * *